United States Patent
Alurralde Iturri et al.

(10) Patent No.: US 11,861,334 B2
(45) Date of Patent: *Jan. 2, 2024

(54) PROVIDING COMMUNICATION BETWEEN A CLIENT SYSTEM AND A PROCESS-BASED SOFTWARE APPLICATION

(71) Applicant: Oracle International Corporation, Redwood Shores, CA (US)

(72) Inventors: Fernando Alurralde Iturri, Foster City, CA (US); Qing Zhong, Fremont, CA (US); Ariel Cohen, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/508,328

(22) Filed: Oct. 22, 2021

(65) Prior Publication Data

US 2022/0043637 A1    Feb. 10, 2022

Related U.S. Application Data

(63) Continuation of application No. 16/818,120, filed on Mar. 13, 2020, now Pat. No. 11,188,310, which is a
(Continued)

(51) Int. Cl.
*G06F 8/35* (2018.01)
*G06F 8/38* (2018.01)
(Continued)

(52) U.S. Cl.
CPC .............. *G06F 8/35* (2013.01); *G06F 8/38* (2013.01); *G06F 8/34* (2013.01); *G06F 8/36* (2013.01)

(58) Field of Classification Search
CPC ........................................................ G06F 8/35
(Continued)

(56) References Cited

U.S. PATENT DOCUMENTS 8,132,113 B2   3/2012   Khan
8,843,941 B2   9/2014   Moore
(Continued)

OTHER PUBLICATIONS

B. Di Martino, A. Esposito, S. A. Maisto and S. Nacchia, "A semantic IoT framework to support RESTful devices' API interoperability," 2017 IEEE 14th International Conference on Networking, Sensing and Control (ICNSC), Calabria, Italy, 2017, pp. 78-83, doi: 10.1109/ICNSC.2017.8000071.*

(Continued)

*Primary Examiner* — Francisco J Aponte
(74) *Attorney, Agent, or Firm* — Trellis IP Law Group, PC

(57) ABSTRACT

Resource-to-operation pairs are received at a user interface. The resource-to-operation pairs are stored in a model abstraction as a flat structure. The resource-to-operation pairs in the flat structure are converted into Representational State Transfer (REST) connectors. The REST connectors are encoded in a conventional interface description language. The REST connectors are stored in webpage code. A request is received at the webpage code from the client system for a service of a process step of the process-based software application. A REST connector in the webpage code translates the request to a message that conforms with the service. A response from the service is received at the webpage code. The response from the service is processed at the webpage code. Data retrieved by the processing of the response is accessed via a browser located at the client system.

16 Claims, 10 Drawing Sheets

Related U.S. Application Data continuation of application No. 15/647,082, filed on Jul. 11, 2017, now Pat. No. 10,628,134.

(60) Provisional application No. 62/395,876, filed on Sep. 16, 2016.

(51) Int. Cl.
*G06F 8/34* (2018.01)
*G06F 8/36* (2018.01)

(58) Field of Classification Search
USPC .......................................................... 717/105
See application file for complete search history.

(56) References Cited

U.S. PATENT DOCUMENTS

| | | | | |
|---|---|---|---|---|
| 8,856,735 | B2* | 10/2014 | Nimashakavi | G06F 16/972 717/106 |
| 9,383,971 | B2* | 7/2016 | Kaplinger | H04L 67/02 |
| 9,521,040 | B2* | 12/2016 | Vergara | H04L 41/082 |
| 9,552,237 | B2 | 1/2017 | Biesack | |
| 9,756,129 | B2* | 9/2017 | Zeng | H04L 67/1097 |
| 9,851,952 | B2* | 12/2017 | Rodrigues | G06F 8/30 |
| 9,886,244 | B2 | 2/2018 | Paternostro | |
| 9,959,363 | B2 | 5/2018 | Kaplinger | |
| 10,223,239 | B1 | 3/2019 | Ghanbaran | |
| 10,761,685 | B2* | 9/2020 | Zhang | G06F 16/9566 |
| 2008/0201338 | A1 | 8/2008 | Castro | |
| 2014/0115017 | A1 | 4/2014 | Pasternak | |
| 2014/0372970 | A1 | 12/2014 | Broussard | |
| 2015/0378994 | A1 | 12/2015 | Kaplinger | |
| 2016/0026461 | A1 | 1/2016 | Bannister | |
| 2016/0094507 | A1 | 3/2016 | Li | |
| 2016/0098254 | A1 | 4/2016 | Paternostro | |
| 2016/0283203 | A1* | 9/2016 | Li | G06F 16/958 |
| 2017/0060730 | A1 | 3/2017 | Li | |
| 2018/0074797 | A1 | 3/2018 | Ludwig | |
| 2020/0226002 | A1* | 7/2020 | MacLeod | G06F 16/2379 |

OTHER PUBLICATIONS

Michael Athanasopoulos and Kostas Kontogiannis: "Extracting REST resource models from procedure-oriented service interfaces"; School of Electrical, NTUA, Athens, Greece. Journal of Systems and Software vol. 100, Feb. 2015, pp. 149-166.

* cited by examiner

PROVIDING COMMUNICATION BETWEEN A CLIENT SYSTEM AND A PROCESS-BASED SOFTWARE APPLICATION

CROSS REFERENCES TO RELATED APPLICATIONS

This application is a continuation of the following application, U.S. patent application Ser. No. 16/818,120, entitled AUTOMATICALLY GENERATING AN INTERFACE DESCRIPTION IN AN INTERFACE DESCRIPTION LANGUAGE, filed on Mar. 13, 2020, which is a continuation of U.S. Pat. No. 10,628,134, entitled GENERIC-FLAT STRUCTURE REST API EDITOR, issued on Apr. 21, 2020, which claims priority from U.S. Provisional Application Ser. No. 62/395,876, entitled GENERIC-FLAT STRUCTURE REST API EDITOR, filed on Sep. 16, 2016, which is hereby incorporated by reference as if set forth in full in this application for all purposes.

This application is related to the following applications: U.S. Provisional Patent Application Ser. No. 62/395,896, entitled CONNECTORS FRAMEWORK, filed on Sep. 16, 2016; U.S. patent application Ser. No. 15/647,096, also entitled CONNECTORS FRAMEWORK, filed on Jul. 11, 2017 ; U.S. Provisional Application Ser. No. 62/395,883, entitled PRE/POST DEPLOYMENT CUSTOMIZATION, filed on Sep. 16, 2016; and U.S. patent application Ser. No. 15/647,059, also entitled PRE/POST DEPLOYMENT CUSTOMIZATION, filed on Jul. 11, 2017 , which are hereby incorporated by reference as if set forth in full in this application for all purposes.

BACKGROUND

The present application relates to computing, and more specifically to software and accompanying mechanisms for facilitating communications between steps of a process-based software application and REpresentational State Transfer (REST) web services.

Mechanisms for facilitating communications between steps of a process-based software application and external services are employed in various demanding applications, including retrieving specific data from backend databases for use in business processes; accessing and/or leveraging software routines running on remote web servers, and so on. Such applications often demand efficient user friendly mechanisms for enabling developers, deployment managers, software configuration managers, and other users, to readily understand externally available computing resources and to readily set up process steps to use those available computing resources.

Conventionally, a developer of a process-based software application wishing to leverage functionality provided by a REST Application Programming Interface (API) or web service, must understand technical details of the API or web service. In particular, to code and/or configure a process step to appropriately call such a REST service, the developer must often have detailed knowledge of what protocols the service uses, which resources (e.g., data and/or functionality) are available via the service; how to appropriately format a call from a particular process step to the REST service, and so on. Such information is often provided, in part, in a Web Application Description Language (WADL) file, Yet Another Markup Language (YAML) file, or RESTful API Modelling Language (RAML) file characterizing the communications interface exposed by the REST service or API.

However, the requirement of in-depth developer knowledge of various REST services and associated WADL (and/or YAML, RAML, etc.) files can provide a barrier to efficient and accurate development of, use of, modification of, and deployment of process-based software applications.

SUMMARY

An example system and method facilitates defining a REpresentational State Transfer (REST) interface in a computing environment. A particular example embodiment includes mechanisms for implementing an example method that includes modelling a REST interface description using a model that represents an abstraction of (or alternative version of) a second REST interface description; employing the model to enable modelling a REST interface description as list of resources containing operations; providing one or more UI controls to enable a developer to specify one or more REST interfaces using the model without manually specifying the description via hand coding of an interface description language (e.g., RAML, YAML, WADL, etc.); and using the one or more specified REST interfaces to automatically generate an interface description in an interface description language.

In a more specific embodiment, the example method further includes using the model to facilitate specification of a REST interface using a REST flat structure. The example method may further include incorporating one or more parameters specified by a developer (or other user) during manipulation of the one or more UI controls into the REST flat structure defined by the model; and employing the REST flat structure and accompanying developer-specified parameters to generate an interface description in an interface description language (e.g., RAML, YAML, WADL, etc.) suitable for implementing a REST API (Application Programming Interface) in a target computing environment.

The one or more UI controls may further include a first user option to define one or more resources and one or more corresponding operations within the one or more resources. A second user option, implemented via the one or more UI controls, facilitates enabling a developer or other user to create one or more business objects from a JavaScript Object Notation (JSON) instance or schema, thereby simplifying user integration tasks. The second user option may include a UI control enabling a developer to paste a JSON response of a call to a REST API, resulting in a pasted JSON response. The pasted JSON response may then be automatically transformed into a business object.

Accordingly, a software editor incorporating the present example embodiment facilitates enabling the user to visualize a REST API (also called REST interface herein) as a list of resources presented in a flat structure, i.e., a simple list of resources containing operations. The software editor may be a fully JS/HTML/CSS (JavaScript, HyperText Markup Language, Cascading Style Sheets) developed editor that lets the user define connectors to Rest API's in an easy and fluid way. Furthermore, the editor facilitates creation of the connector to the REST API in a generic fashion, without requiring user knowledge of any particular interface or description language, such as RAML, YAML, WADL, etc. The user may merely define resources and operations within those resources. The enhanced software editor also facilitates creation of business objects from a JSON instance or schema.

In certain embodiments, the REST editor and accompanying simplified model or structure for describing a REST API interface, facilitate construction of REST API connectors used to connect steps (e.g., corresponding to flow elements) of process-based software applications to external services to be called by the steps. The developed REST API connectors may be available to other software application developers via a catalog of connectors. A user, e.g., developer, can now readily develop, use, and share REST API connectors for virtually any of REST API or service without needing to know details of the underlying WADL file or other interface description characterizing the exposed interface of the REST API or service.

A further understanding of the nature and the advantages of particular embodiments disclosed herein may be realized by reference of the remaining portions of the specification and the attached drawings.

DETAILED DESCRIPTION OF EMBODIMENTS

Figure 1:
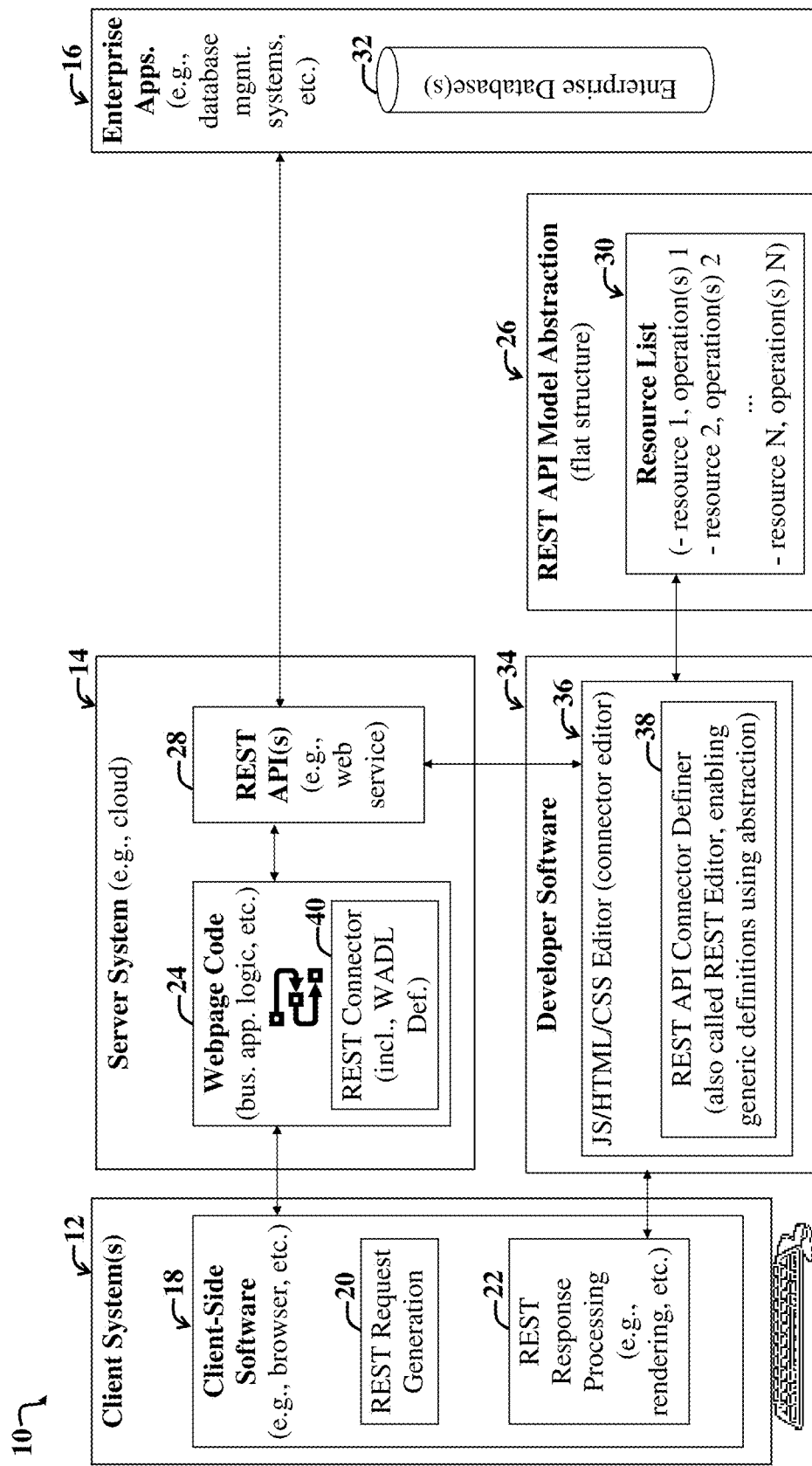
FIG. 1 is a first block diagram illustrating a conceptual view of first example system and accompanying computing environment that facilitates enabling developers to define REpresentational State Transfer (REST) interfaces (also called REST API connectors REST web services connectors herein) using an interface model that models REST APIs or web services as a list of resources and corresponding operations.

Conventionally, software developers, configuration managers, deployment managers, and other users of a computing environment may subscribe to certain cloud services to facilitate development, configuration, and deployment of software applications and storage of associated files. A cloud service that is configured for software application or process flow development, management, and/or deployment is called a Process Cloud Service (PCS) herein.

A process cloud service may employ a networked database to store files and other objects used by a given software program being developed. Server-side development environments may be accessible to developers via a browser. The development environments may be backed by the PCS, such that developed software application files are stored in the PCS database.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

Certain embodiments discussed herein are particularly useful for development, deployment, and implementation of webpage code and associated REST interfaces and services.

For the purposes of the present discussion, a web service may be any computer code and associated functionality that is adapted to be called by an application or other service or process whose code is stored in a separate location (e.g., on another computer or memory storage location or device) from the web service. Accordingly, the term "service" as used herein is relatively broad and may include remotely accessible APIs and services characterized by Web Services Description Language (WSDL) interfaces, Simple Object Access Protocol (SOAP), REpresentational State Transfer (REST), YAML (Yet Another Markup Language), and/or other types of interfaces.

Generally, web services, also simply called services herein, provide functionality, e.g., capabilities, that may be reused by different applications, processes, or web services (that may be distributed across a network), which access the functionality via a service interface (e.g., WSDL interface) consistent with a description of the web service. A web services model may represent a loosely coupled integration model for allowing flexible integration of various network-distributed applications or processes.

Business process-based software applications are often modeled using Business Process Model and Notation (BPMN). Software development tools for enabling business users, developers, designers, and so on, may provide features for interacting with and/or manipulating BPMN graphical representations of the process-based software application during development of the application.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For clarity, certain well-known components, such as hard drives, processors, operating systems, power supplies, routers, Internet Service Providers (ISPs), workflow orchestrators, process schedulers, Tenant Automation Systems (TASs), certain web services, virtual machines, middleware, enterprise databases, MetaData Services (MDS) modules, and so on, are not necessarily explicitly called out in the figures. However, those skilled in the art with access to the present teachings will know which components to implement and how to implement them to meet the needs of a given implementation.

FIG. 1 is a first block diagram illustrating a conceptual view of first example system 10 and accompanying computing environment that facilitates enabling developers to create REpresentational State Transfer (REST) interface connectors 40 (also simply called REST connectors herein) using an interface model 26 that enables defining of a REST API or service 28 using a list of resources and corresponding operations.

For the purposes of the present discussion, a connector may be any mechanism that facilitates interfacing or otherwise facilitates intercommunications between different software components and/or computing resources. Connectors discussed herein generally include added functionality over conventional software components used to make web service calls, where the added functionality may be visualized as a layer of abstraction that simplifies developer use of external services for implementing steps of process-based software applications.

Note that the REST connector 40 acts as a first interface between one or more steps of a process-based software application implemented by the webpage code 24, and one or more REST APIs or services 28 called by the webpage code 24. The REST connector(s) 40 include code for translating service or API calls of a process step into messages that conform to acceptable message types and protocols, as defined by an exposed interface description (e.g., as may be provided by a WADL file) for the REST API or service 28.

Note that the overall system 10 may represent a networked computing environment, such as a networked enterprise computing environment. Furthermore, note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

The example system 10 includes one or more client systems 12 running client-side software 18, e.g., a browser, which is usable to generate REST requests 20 and to process corresponding responses 22. Note that alternatively, or in addition, the webpage code 24 generates REST requests (e.g., for data from a backend database 32) to one or more REST APIs or services 28, and processes responses, in response to user interaction with the webpage code 24 via the browser 18.

Accordingly, the REST request generation 20 may arise, for example, from certain user interaction with a BPMN (Business Process Model and Notation) process represented by a graphical BPMN process flow. Data retrieved, e.g., by the REST APIs or service 28, from the enterprise applications (e.g., the enterprise database 32) may be user accessible via the browser 18 after response processing by the webpage code 24, and further processing (e.g., rendering) 22 by the client-side browser 18.

Accordingly, in the present example embodiment, requests 20 are sent from the client system(s) 12 to a server system 14, where they are processed in accordance with web page code 24, which may employ the REST API 28 to interface with software applications 16 and accompanying databases 32 to retrieve and/or otherwise interact with or change content provided via the applications 16, e.g., enterprise applications and accompanying databases 32.

In the present example embodiment, a developer system 34 facilitates development of webpage code 24 and associated REST connector(s) 40 and REST API(s) 28 using a connector editor 36, which may represent a full-featured JS/HTML/CSS editor.

Note that while the REST connector 40 and the REST APIs 28 are shown as separate blocks in FIG. 1, that conceptually, a developer or other user may view or understand the REST connector 40 as representing the REST API 28, such that it may be considered part of the REST API 28. Accordingly, when developing process-based software applications, a developer may employ the developer software 34 to assign different REST connectors to different flow elements of a process-based software application, for use thereby in accessing data and/or functionality provided by the REST API or service associated with and described by the REST connector 40.

The example connector editor 36 includes a REST API connector definer 38, which facilitates enabling a developer or other user to define the REST connectors 40 (and consequently define the interfaces between the REST API(s) 28 and steps of a process-based software application implemented via the webpage code 24). Conventionally, a developer may hand-code the REST interface definition 40, e.g., using an interface modeling language, e.g., RAML (RESTful API Modeling Language), YAML (Yet Another Markup Language), WADL (Web Application Description Language), etc. However, such tasks can be tedious, especially when such conventional RAML, YAML, or WADL interfaces can be characterized by relatively complicated models that may be difficult for a developer to visualize or work with.

Accordingly, the REST API connector definer 38 includes computer code that implements a simplified interface description model 26 characterized by a flat structure represented by a list of available resources 30 (also simply called resource list) and associated operation(s). The flat structure of the resource list 30 is used by the REST API connector definer 38 to back a set of simplified UI display screens provided by the connector editor 36. The UI display screens are said to be simplified, as users, e.g., developers, interacting therewith are presented with options to interact with the design of the REST connector 40 as though the REST connector has been simplified to (or abstracted to) a description of its resources and operations. The remaining technical details involved in the actual WADL description of the REST APIs or services 28 are automatically handled by the connector editor 36, as the edited simplified model is mapped back into the more complex WADL description file that is saved with the deployed REST connector 40 and accompanying webpage code 24.

Note that while the client-side browser 18 currently illustrates content 20, 22 from the perspective of an end user that is accessing the webpage code 24 to participate in a process-based software application implemented thereby, that instead (or in addition), the client-system may represent a developer system, whereby the browser 18 is used to browse to a site that provides a development environment (e.g., as may be hosted on a process cloud) backed by the developer software 34.

The REST API connector definer 38 further includes computer code for rendering developer UI display screens (as discussed more fully below with reference to FIG. 4) with various UI controls and associated options for enabling the developer to treat the REST connector 40 as though it is actually encoded directly using the flat structure 30 and associated REST interface model 26.

For the purposes of the present discussion, UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A UI control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

As a developer enters information into UI display screens of the connector editor 36, for defining a particular REST API, the description may populate the REST API model 26, e.g., by specifying resources for an interface and associated operation(s) that apply to those resources.

The REST API connector definer 38 then runs (or causes running of) computer code for translating, mapping, or otherwise converting the populated REST API model 26 into the REST connector(s) 40 for use in the computing environment 10 to enable end users to employ the client systems 12 to interact with a backend database 32 (and/or other computing resources) via the webpage code 24, REST connector(s) 40 and corresponding REST API(s) 28.

Note that the actual REST connector 40 may be automatically encoded by the REST API connector definer 38 using a conventional interface description language, e.g., Web Application Description Language (WADL).

Furthermore, note that the developer software 34 may be part of or may otherwise leverage other computing resources, i.e., other than a desktop developer computer. For example, the developer software 34 may further include or otherwise leverage computing resources of a process cloud for hosting a server-side development environment, which may support running the connector editor 36. As set forth above, the connector editor 36 uses the REST API model abstraction 26 (or alternative interface description structure) to facilitate automatically generating the REST connector(s) in response to developer input defining resources and operations available via the REST API(s) 28 and associated REST connector(s) 40.

Note that while the REST API(s) 28 are shown as part of the same server system 14 as the webpage code 24, that embodiments are not limited thereto. The REST API(s) or service(s) 28 may run on a separate server system or cloud (that is still accessible for calls by the webpage code 24 and REST connector(s), e.g., via the Internet), without departing from the scope of the present teachings.

Figure 2A:
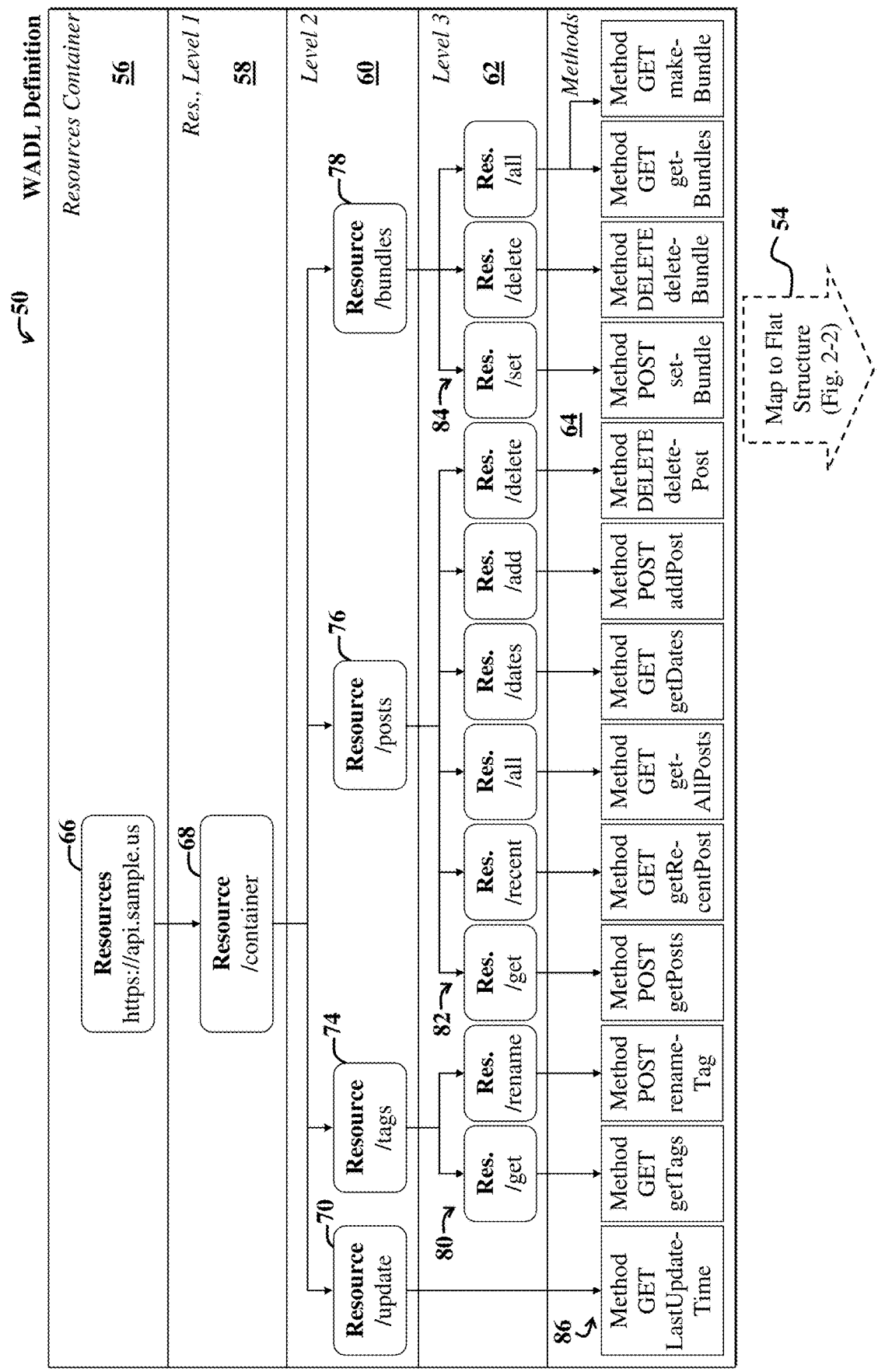
FIG. 2A is a first portion of a diagram (that is split between FIGS. 2A and 2B) illustrating a first example WADL REST interface description that is mapped (via a first example mapping) to a first example REST flat structure (as shown in FIG. 2B) characterizing the interface model of FIG. 1.
Figure 2B:
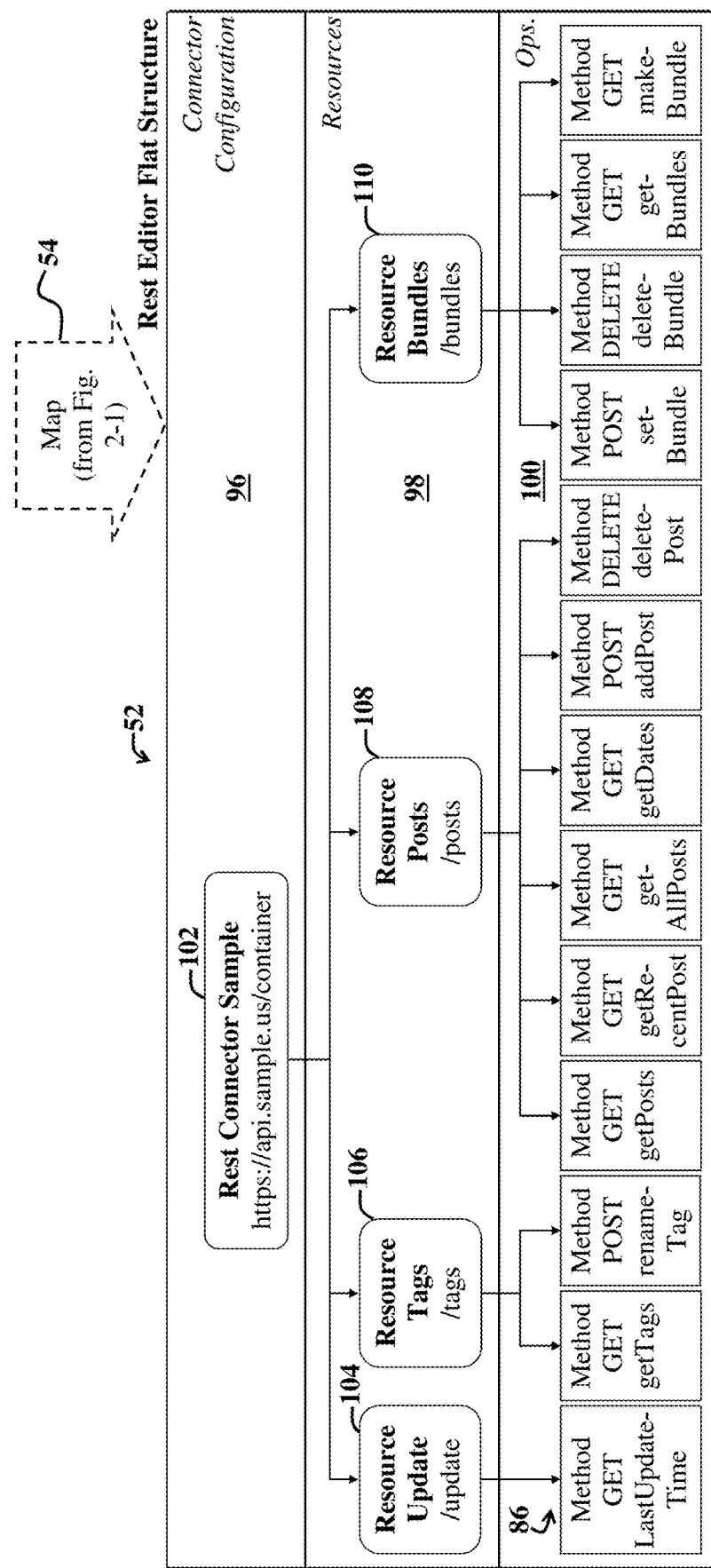
FIG. 2B is a second portion of a diagram, continued from FIG. 2A, illustrating the first example REST flat structure resulting from the first example mapping that maps the a first example WADL REST interface description to the a first example REST flat structure characterizing the interface model of FIG. 1.

FIGS. 2A-2B represent a diagram that is split between two sheets and illustrates a first example mapping 54 between a first example Web Application Description Language (WADL) REST interface description 50 (as shown in FIG. 2A) and a first example substantially REST flat structure 52 (as shown in FIG. 2B) that characterizes the resource list 30 and accompanying interface model 26 of FIG. 1.

Note that depending upon the needs of a given implementation, a WADL definition 50 (FIG. 2A) can be converted into a REST editor flat structure model 52 (FIG. 2B) and vice versa using properties of the mapping 54 of FIGS. 2A-2B, i.e., the direction of the mapping 54 shown in FIGS. 2A-2B is illustrative and can readily be reversed to meet the needs of a given implementation.

With reference to FIGS. 1 and 2, the mapping 54 may be implemented via the REST API connector definer 38 of FIG. 1, which also includes computer code for enabling not just defining REST API connectors in terms of the resource list 30, but translating the defined resource list 30 used for a given REST API connector into a WADL (or other type of description) description for deployment of the REST API connector 40 of FIG. 1 for use in facilitating interfacing the REST API(s) 28 with the webpage code 24 of FIG. 1.

In FIG. 2A, the example WADL definition 50 conforms to an example WADL specification that is discussed more fully below with reference to FIG. 3. Note that the WADL definition 50 includes multiple levels of resources 58-62 within a resource container 56. The various levels of resources 58-52 include various nested resources, where the lowest level resources 80-84 at a third resource level 62 are used for accessing various methods 86, also called operations, at a lowest level 64 of the WADL definition.

The example WADL definition includes a top-level resource container 66, which is associated with a container Uniform Resource Locator (URL), e.g., "https://api.sample.us" which represents a network path to the resource container 66. A first resource level 58 includes a first resource 68 (accessible via the "https://api.sample.us/container" path). The first resource includes additional resources 70-78 nested within the first resource 68. Similarly, the different groups of resources 80, 82, 84 in the third resource level 62 are accessible via parent resources 74, 76, 78 of the second resource level respectively.

Similarly, the different groups of resources 80, 82, 84 in the third resource level 62 may be used to access various methods 86 of the operations level 64. Note that one resource 70 of the second resource level 60 may be used to access one of the methods (i.e., operations) 86 of the methods or operations level 64.

Accordingly, note the complexity of the WADL structure 50 characterizing an example REST API to be accessed via one or more steps of a process-based software application. A developer attempting to use the methods 86 may have difficulty understanding how to specify the endpoints to those methods 86; how to configure the calls to those methods 86, and so on. Furthermore, note that in certain WADL interface descriptions, a given REST API WADL definition may exhibit not just nesting, but various loops and cycles.

Accordingly, certain embodiments herein collapse the structure characterizing the WADL definition 50 into one level of resources, e.g., corresponding to the one resource level 98 in FIG. 2B. This is why the structure 52 of FIG. 2B is called a flat structure, i.e., it includes one level 98 of resources 104-110. This helps to enable a user working with a REST connector editor (e.g., the editor 36 of FIG. 1) to understand or visualize the associated software application providing the REST API (e.g., 28 of FIG. 1) for enabling access to the operations 86, as a list of resources 104-110 that are usable to access associated operations 86. The flat structure 52 of FIG. 2B is analogous to the resource list 30 of FIG. 1.

Note that in the flat structure 52 of FIG. 2B, the first two levels 56, 58 of the WADL definition have been collapsed, such that the new container 102 represents a REST connector representing the combination of the resource container 66 and first resource 68 of FIG. 2A. Other resource levels 60-62 of the WADL definition of FIG. 2A are similarly collapsed into the single level 98 of resources 104-110 in FIG. 2B, as part of the mapping operation 54.

Figure 3:
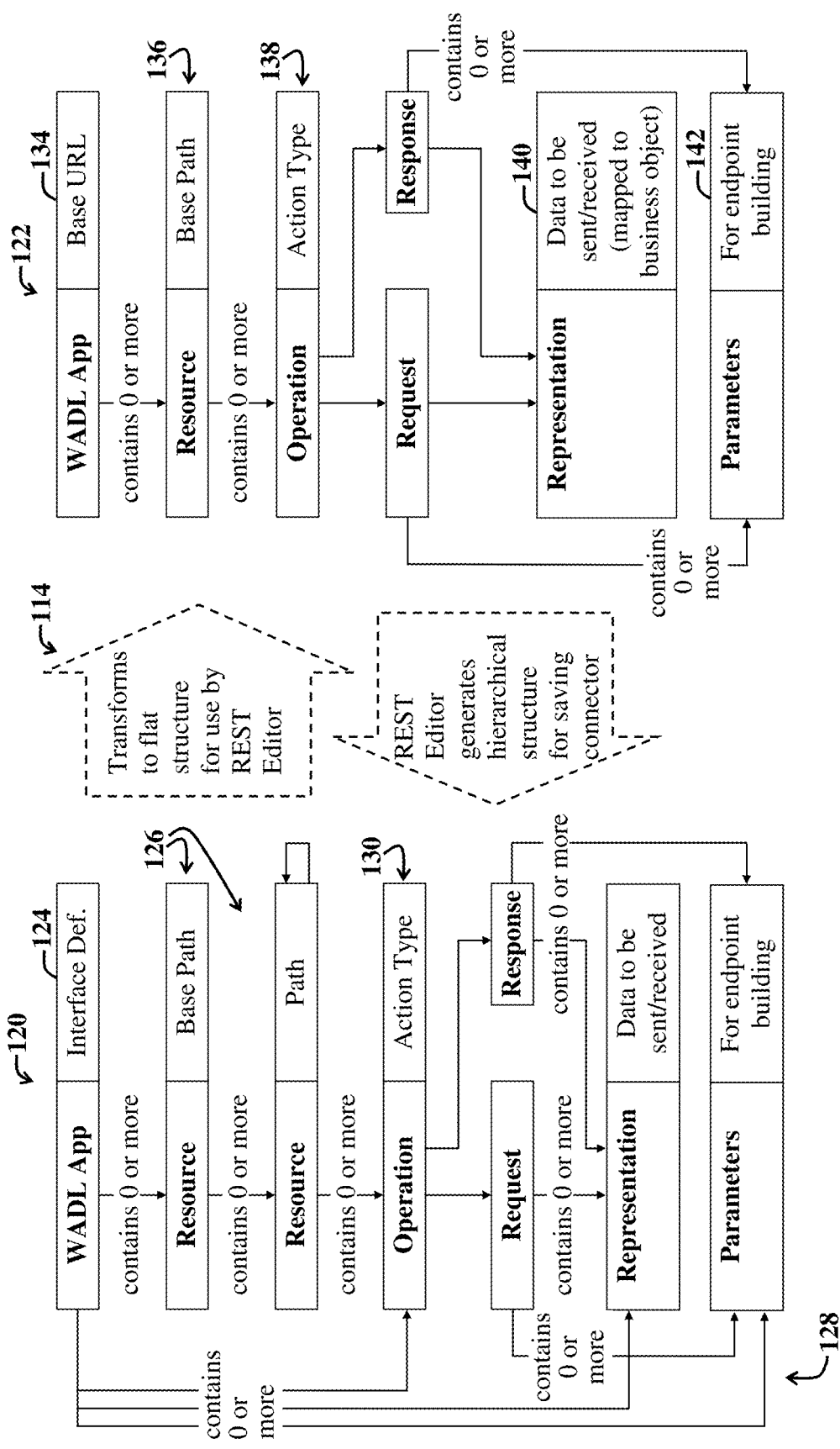
FIG. 3 is a diagram illustrating a second example mapping between a second example generalized WADL REST interface specification and a second example REST flat structure specification that may characterize the interface model of FIG. 1.

FIG. 3 is a diagram illustrating a second example mapping 114 between a second example generalized WADL REST interface specification 120 and a second example REST flat structure specification 122. With reference to FIGS. 2A-2B and 3, note that the example WADL definition 50 of FIG. 2A (for an example REST API) has been constructed in accordance with the example WADL specification 120, which describes a software application used to implement a REST API or service.

The WADL specification 120 of FIG. 3 includes multiple layers of resources provided by the described WADL application, which is described by its corresponding interface definition 124. An example of such interface definition 124 is provided as the WADL definition 50 in FIG. 2A.

The WADL specification 120 includes multiple levels of resources 126, which are characterized by different paths 126, and which may be used to access one or more operations 130. The different operations 130 (e.g., Request and Response operations) may also contain parameters and representations of data to be sent and/or received. The WADL definition 120 includes various connecting lines 128, which show nesting and/or looping relationships between elements of the WADL specification 120.

The second example mapping operation 114 is analogous to the mapping operation 54 of FIGS. 2A-2B, and illustrates a generalized approach for implementing the mapping 114, which may be bi-directional as needed.

The WADL structure 120 may be transformed by the mapping 114 into the simplified flat REST editor flat structure 122. Note that the flat structure 122, which is characterized by a base URL 134, a single resource level 136 with a base path to a particular operation 138 that is described by a particular action type.

The operation may be a request and/or response operation that may include a representation of data to be sent and/or received 140, and one or more configurable parameters 142. Accordingly, the flat structure 122 can be used by the REST connector editor 36 (also simply called REST editor herein) of FIG. 1 to describe constructed REST connectors. The resulting description can then be transformed back into a WADL definition in accordance with the WADL structure 120 using the mapping 114.

Figure 4:
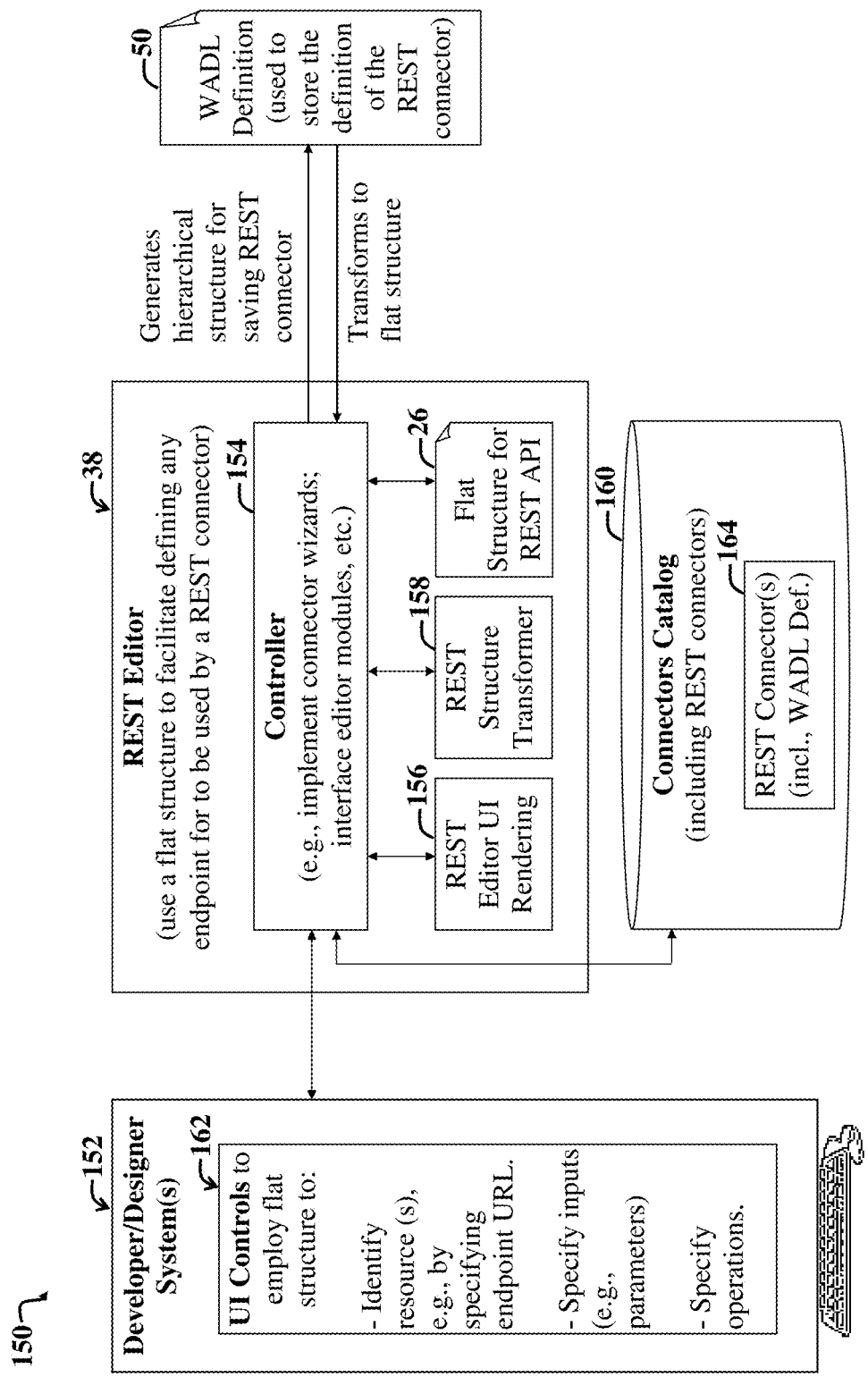
FIG. 4 is a block diagram illustrating a second example system and accompanying functions (including WADL structure mapping) performed by the REST connector editor, and illustrating communications between the REST connector editor and a developer system and accompanying UI display screen(s) that are used to define specific REST connectors usable for implementing flow elements (e.g., steps) of a process-based software application.

FIG. 4 is a block diagram illustrating a second example system 150 and accompanying functions (including WADL structure mapping) 156, 158, 162 performed by (or otherwise supported by) the REST connector editor 38, and illustrating communications between the REST connector editor 38 and a client developer system 152 and accompanying UI display screen(s) 162 that are used to define specific REST connectors 160 usable for implementing flow elements (e.g., steps) of a process-based software application.

The example REST editor 38 (also called REST connector editor or REST API connector definer or editor in FIG. 1) includes a controller 154, which includes code for facilitating interfacing the different modules 26, 50, 156-162 shown in FIG. 4. The controller 154 further includes code for implementing connector wizards (and/or for calling other code to implement the wizards); and code for communicating with a rendering module 156 for generating rendering instructions for various UI display screens and accompanying UI controls 162 (e.g., for wizards), which may be accessible to the developer systems 152 via a browser.

Note that code 156 for generating REST editor UI rendering instructions may include code for implementing various wizards, e.g., connector configuration wizards, connector construction wizards, connector deployment wizards, and so on. Furthermore, the REST structure transformer 156 may include code for transforming a WADL definition 50 describing a particular REST API into the flat structure 26 and vice versa, in accordance with the example mappings 54 of FIGS. 2A-2B and 114 of FIG. 3.

REST connectors 164 that are built using the REST editor 38 may be stored in the connectors catalog 160. The connectors catalog 160 and accompanying connectors 164 stored therein may be accessed by other authorized users of the system 150 for use in building process-based software applications.

Note that while various modules 156, 158 of the REST editor 38, and the connectors catalog 160, may be implemented, in part, using functionality that is implemented outside of the REST editor module 38, without departing from the scope of the present teachings. For example, the REST editor 38 may include code for calling modules provided by a connectors framework to implement various connector-related functions as needed. For example, the mappings implemented via the REST structure transformer 158 may be implemented in response to a call from the REST editor 38 to one or more functions in a connectors framework, which are built to transform WADL structures and associated definitions into flat structures usable by the REST editor 38 to facilitate construction of the various UI controls 162 and associated connector wizards.

For the purposes of the present discussion, a connectors framework may be any reusable set of data and/or software functionality for implementing one or more functions pertaining to connectors. Accordingly, a connectors framework may represent a type of software framework. Example functions pertaining to connectors include implementing tools to facilitate user construction, configuration, deployment, and use of connectors. The functionality provided by a connectors framework may be distributed across a network, i.e., implemented via one or more servers.

Note that the REST editor 38 of FIG. 4 may be coupled with (i.e., in communication with) additional modules in a process cloud environment, without departing from the scope of the present teachings. For example, the REST editor 38 may incorporate functionality for reading files comprising a process-based software application so as to facilitate identifying and further configuring or otherwise modifying any connectors packaged with the process-based software application.

Figure 5:
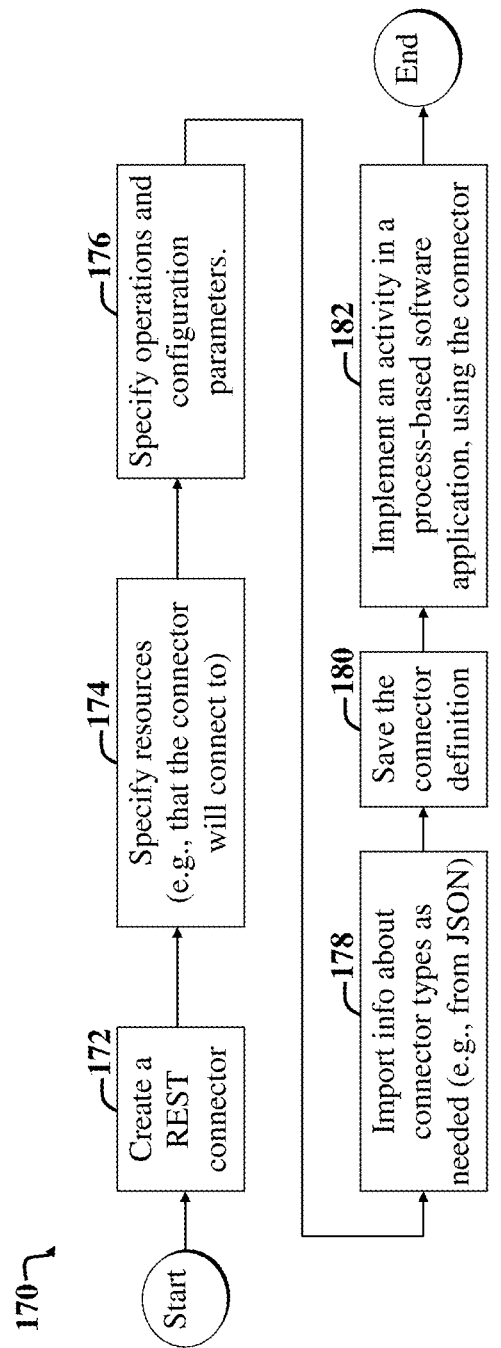
FIG. 5 is a flow diagram illustrating an example user (e.g., developer) experience when using the systems of FIGS. 1 and 4 to create and use a REST connector in a process-based software application.

FIG. 5 is a flow diagram illustrating an example user (e.g., developer) experience flow 170 when using the systems 10, 150 of FIGS. 1 and 4 to create and use a REST connector in a process-based software application. The user experience flow 170 may be performed by a developer or designer of a process-based software application.

With reference to FIGS. 4 and 5, the user experience flow 170 includes initially creating a REST connector 172. REST connector creation 172 may involve using one or more of the UI controls 162 and associated functionality of the REST editor 38 of FIG. 4 to create an initial connector container and specify a connector name. This step 172 may correspond to constructing the first level or layer 96 of the REST editor flat structure 52 of FIG. 2B.

Next, in a resource-specifying step 174, the user employs the one or more of the UI controls 162 and associated functionality of the REST editor 38 of FIG. 4 to specify one or more resources for the REST API connector. This can be analogous to specifying the second level 98 of the example REST editor flat structure 52 of FIG. 2B.

Next, in a resource-specifying step 174, the user employs the one or more of the UI controls 162 and associated functionality of the REST editor 38 of FIG. 4 to specify one or more operations for the REST API connector being developed. This can be analogous to specifying the third level 100 of the example REST editor flat structure 52 of FIG. 2B.

A subsequent importation step 178 involves importing any requisite information about a particular connector type (e.g., information specifying any data mappings). The additional information about the connector type may include information about different file types, protocols, default security configuration information, and so on, for a particular type of connector.

The information about the particular connector type (e.g., where the type may be type REST API) may be imported from the connectors library (or elsewhere) as a JavaScript Object Notation (JSON) file, which may be deserialized (from JSON and converted into an object) and serialized (converted from the object back into a JSON file) as needed to meet the needs of a given implementation.

Next a connector-saving step 180 includes saving the resulting connector definition. The connector definition may be saved in the connectors catalog 160 of FIG. 4. In the present example embodiment, when the connector 164 is saved to the catalog 160 of FIG. 4, its flat structure 26 is converted back into a WADL structure 50, e.g., subsequent deployment and use with a deployed process-based software application.

Next, an implementation step 182 includes using the connector to implement an activity (e.g., process step corresponding to a BPMN flow element) in a process-based software application.

Figure 6:
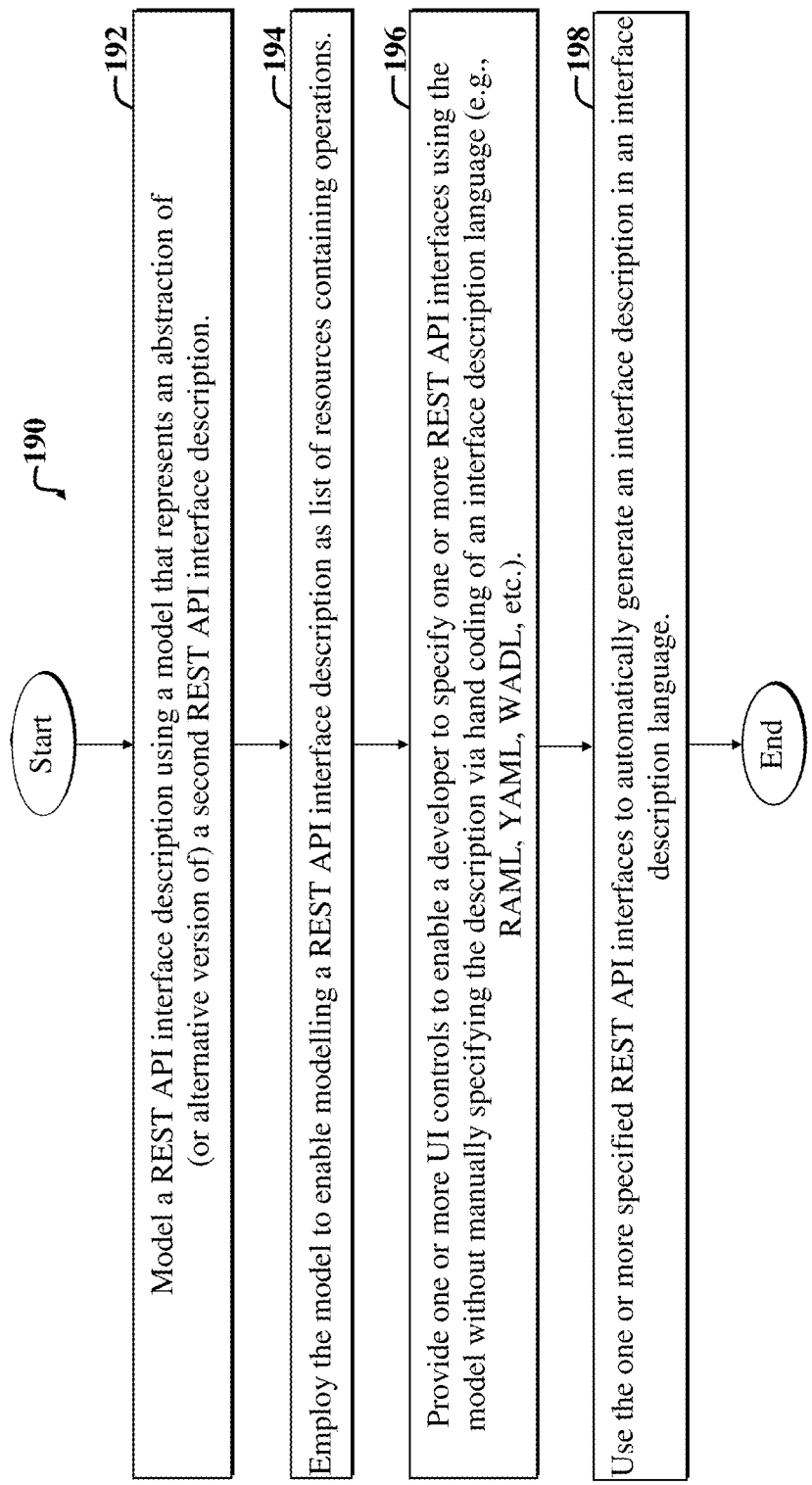
FIG. 6 is a flow diagram of a first example method implementable via the embodiment of FIGS. 1-5, wherein the first example method is from the perspective of a REST editor.

FIG. 6 is a flow diagram of a first example method 190 implementable via the embodiments of FIGS. 1-4. The example method 190 facilitates defining a REST interface in a computing environment, where in this particular context, the REST interface corresponds to (or is otherwise implemented using) a REST connector.

Note that, depending upon the context in which the term is used, the term "REST interface" may refer to a REST connector that acts as an interface between a process step and a REST API or service called by the process step. Alternatively, when separate code of a process step calls the REST connector to then call the service, one REST interface may refer to the interface between the code of the process step and the REST connector, and another REST interface may refer to the interface between the REST connector and the REST API or service called by the REST connector.

The example method 10 includes a first step 192, which involves modelling a REST interface description using a model that represents an abstraction of, or alternative version of, a second REST interface description. The alternative version of the second REST interface description is represented by or as exemplified by the flat structure 52 of FIG. 2B and the flat structure specification 122 of FIG. 3. For example, with reference to FIG. 3, the flat REST structure 122 represents an abstraction of the more complicated WADL structure 120. Similarly, the example flat structure 52 of FIG. 2B represents and abstraction of the more complicated WADL definition 50 of FIG. 2A.

A second step 194 includes employing the model to enable modelling a REST interface description as list of resources containing operations. For example, the list of resources can correspond to the list 30 of FIG. 1; the row or level of resources 98 of FIG. 2B; the resource 136 of FIG. 3, and the flat structure 26 of FIG. 4.

A third step 196 includes providing one or more UI controls (e.g., the UI controls 162 of FIG. 4) to enable a developer to specify one or more REST interfaces (e.g., REST API connectors) using the model without manually specifying the description via hand coding of an interface description language (e.g., RAML, YAML, WADL, etc.).

A fourth step 198 includes using the one or more specified REST interfaces (e.g., REST API connectors) to automatically generate an interface description (e.g., WADL definition 40 of FIG. 1; WADL definitions inherent in 50, 164 of FIG. 4, etc.) in an interface description language.

Note that the method 190 may be altered, without departing from the scope of the present teachings. For example, the method 190 may further specify that the fourth step 196 further includes using the model to facilitate specification of a REST interface using a REST flat structure; incorporating one or more parameters (e.g., parameters 142 of FIG. 3) specified by a developer during manipulation of the one or more UI controls (e.g., UI controls 162 of FIG. 4) into the REST flat structure (e.g., flat structure 26 of FIG. 4) defined by the model; and employing the REST flat structure and accompanying developer-specified parameters to generate an interface description (e.g., corresponding to a REST connector) in an interface description language (e.g., RAML, YAML, WADL, etc.) suitable for implementing a REST API connector (e.g., corresponding to the connector 40 of FIG. 1) in a target computing environment (e.g., the computing environment of the server system 14 of FIG. 1).

The one or more UI controls may include a first user option to define (e.g., (e.g., a UI control for defining) one or more resources and one or more corresponding operations within the one or more resources (as illustrated in FIGS. 2A-2B and FIG. 3, where the operations 86 of FIG. 2B are considered to be "within" the resources 104-110, and where in FIG. 3, the operation 138 is considered to be "within" the resource 136).

The one or more UI controls may further include a second user option to create one or more business objects from a JavaScript Object Notation (JSON) instance or schema, thereby simplifying user integration tasks. The second user option may include a UI control enabling a developer to paste a JSON response of a call to a REST API, resulting in a pasted JSON response; then transforming the pasted JSON response into a business object.

Note that in the present example embodiment, when the REST editor (e.g., the REST editor 38 of FIG. 4) works with an interface description or definition (e.g., WADL definition), e.g., to build a REST connector, it works using the flat REST structure (e.g., the flat structure 26 of FIG. 4). When the REST editor saves the interface description, it saves the associated REST connector to a format characterized by a description language (e.g., WADL) consistent with that used by the REST API or service that the REST connector will be used to communicate with, i.e., to call and receive data and/or otherwise use functionality afforded by the REST API or service.

Accordingly, the example method 190 may further include using the REST connector to interface a process step of a process-based software application with a REST API or web service to be called by the process step. The process step may correspond to a flow element in a Business Process Model and Notation (BPMN) model of the process-based software application.

Figure 7:
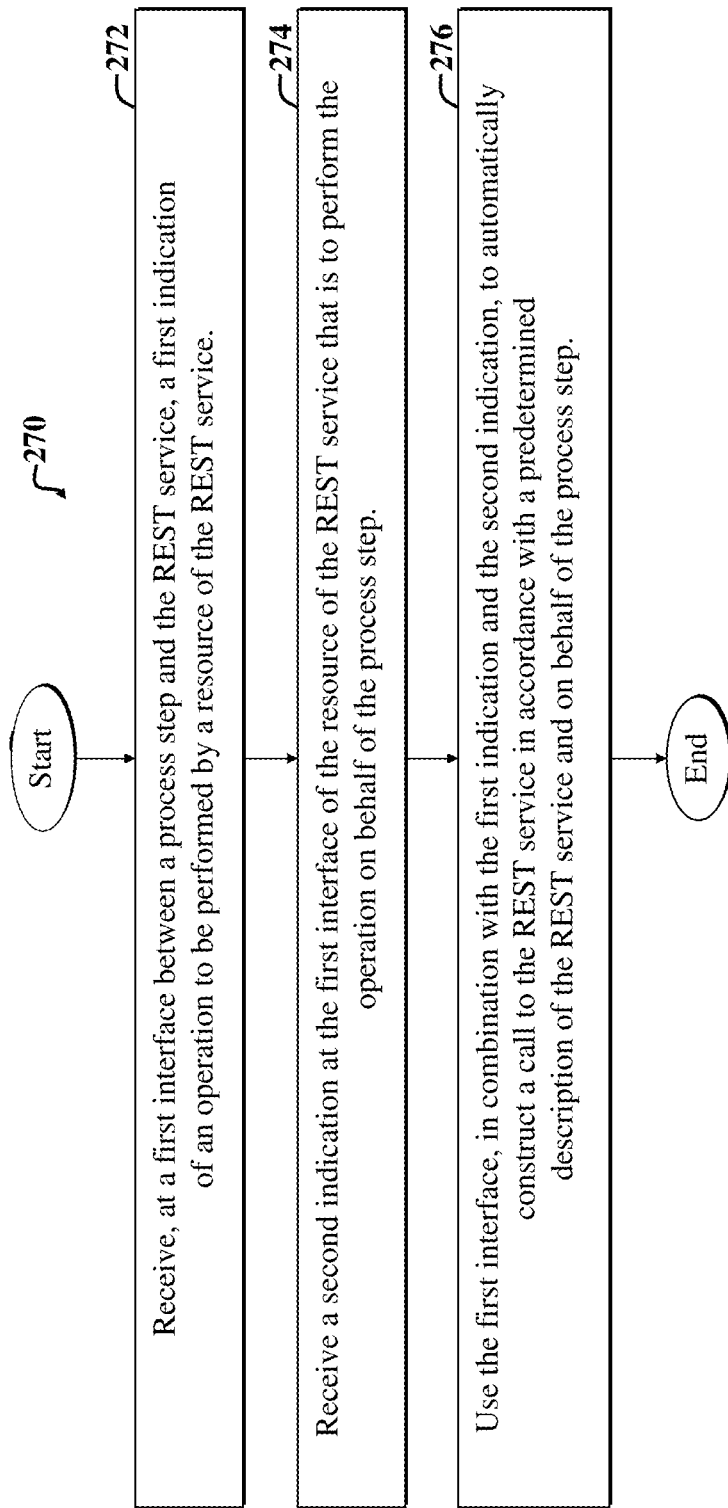
FIG. 7 is a flow diagram of a second example method implementable via the embodiment of FIGS. 1-5, wherein the second example method is from the perspective of a connector and/or connectors framework.

FIG. 7 is a flow diagram of a second example method 270 implementable via the embodiment of FIGS. 1-5, wherein the second example method 270 is from the perspective of a REST connector and/or connectors framework used by a REST editor to implement various functions thereof.

Note that in general, various embodiments discussed herein pertaining to use of a layer of abstraction (e.g., implemented via a REST connector as discussed herein) between a REST service (e.g., corresponding to the REST API(s) 28 of FIG. 1) and a step of a process-based software application (e.g., represented by the webpage code 24 of FIG. 1), can greatly facilitate REST connector setup, use, and configuration changes.

The second example method 270 represents a communications method for facilitating communications between a process step of a process-based software application and a REST service (e.g., using a REST connector).

The second example method 270 includes an initial receiving step 272, which includes receiving, at a first interface between a process step and the REST service, a first indication of an operation to be performed by a resource of the REST service. For example, if the first step 272 is implemented pre-deployment (e.g., before deployment of a process-based software application that will use a REST connector to have an operation performed for the process-based software application using a call to an external REST API or service), then the first indication may corresponding to a specification of the operation 138 of FIG. 3 responsive to user specification of the operation via one or more of the UI controls 162 of FIG. 4.

In cases where the method 270 is implemented post-deployment, the indication of the operation to be performed is received by the REST connector (e.g., REST connector 40 of FIG. 1) from a process step of the webpage code 24, wherein the REST connector is to call the REST connector 40 to implement the operation using the REST API 28 of FIG. 1.

A subsequent second receiving step 274 includes receiving a second indication of the resource of the REST service that is to perform the operation on behalf of the process step. For example, if the second step 274 is implemented pre-deployment the second indication may correspond to an indication of the resource 136 of FIG. 3 responsive to user specification of the resource via the one or more UI controls 162 of FIG. 4.

In cases where the method 270 is implemented post-deployment, then indication of the resource used to implement the operation may be passed from a process step, e.g., of the webpage code 24 of FIG. 1, to the REST connector 40, which may then package the information about the resource and operation into a request to be sent to the REST API 28 of FIG. 1.

A third step 276 includes using the first interface, in combination with the first indication and the second indication, to automatically construct a call to the REST service in accordance with a predetermined description of the REST service and on behalf of the process step. Note that if the third step 276 is implemented pre-deployment, then the call that is constructed represents an instruction as to how to make such a call when it is implemented post-deployment.

In cases where the third step 270 is implemented post-deployment, then the third step 276 may involve the REST connector 40 of FIG. 1 automatically packaging and formatting an input resource/operation pair to be delivered to the REST API 28 as a request message that has been formatted in accordance with the WADL definition 40 exposed by the REST API 28 and used by the REST connector 40 to package calls (e.g., prepare and format request messages) for delivery to the REST APIs 28 of FIG. 1.

Note that the second example method 270 may be altered, without departing from the scope of the present teachings. For example, the first two steps 272, 274 may be interchanged. Furthermore, additional steps or details may be provided, or certain steps or details may be removed.

For example, the third step 276 of the second example method 270 may further include mapping information pertaining to the first indication and the second indication into a WADL file.

The mapping (e.g., corresponding to the mapping 54 of FIGS. 2A-2B or 114 of FIG. 3) may be performed to transfer a flat structure of a WADL representation into a hierarchal representation (e.g., corresponding to the representation 50 of FIG. 2A or 120 of FIG. 3) of the WADL file.

The predetermined description of the REST service may include a description of an exposed second interface of the REST service. The second interface may be provided in an interface description file for the REST service, whereby the first interface acts as an abstraction of the second interface.

The first interface may include or represent a REST connector. The REST connector may communicate with the REST service via the second interface that is exposed by the REST service. The first interface may further include one or more connectors, which are characterized by one or more connector configurations.

The one or more connector configurations may include one or more parameters. The one or more parameters may include a network address (e.g., a URL) for an endpoint associated with the resource of the REST API to be called by the one or more connectors.

Note that the interface description file need not be limited to WADL format, but instead can be a RAML file, a YAML file, or other type of file, without departing from the scope of the present teachings. Furthermore, note that the call to the REST API or service may be structured in accordance with the description of the exposed second interface.

The third step 276 may further include mapping a first interface model (describing the first interface as indicating a collection of one or more resources and one or more associated operations), into a second interface model (describing the second interface in accordance with a WADL description). The first model may be characterized by a substantially flat structure, and the second model is characterized by a hierarchical structure, e.g., with one or more nested resources.

The so-called "process step" may correspond to a flow element in a BPMN model of the process-based software application (e.g., the process-based software application implemented via the webpage code 24 of FIG. 1).

Figure 8:
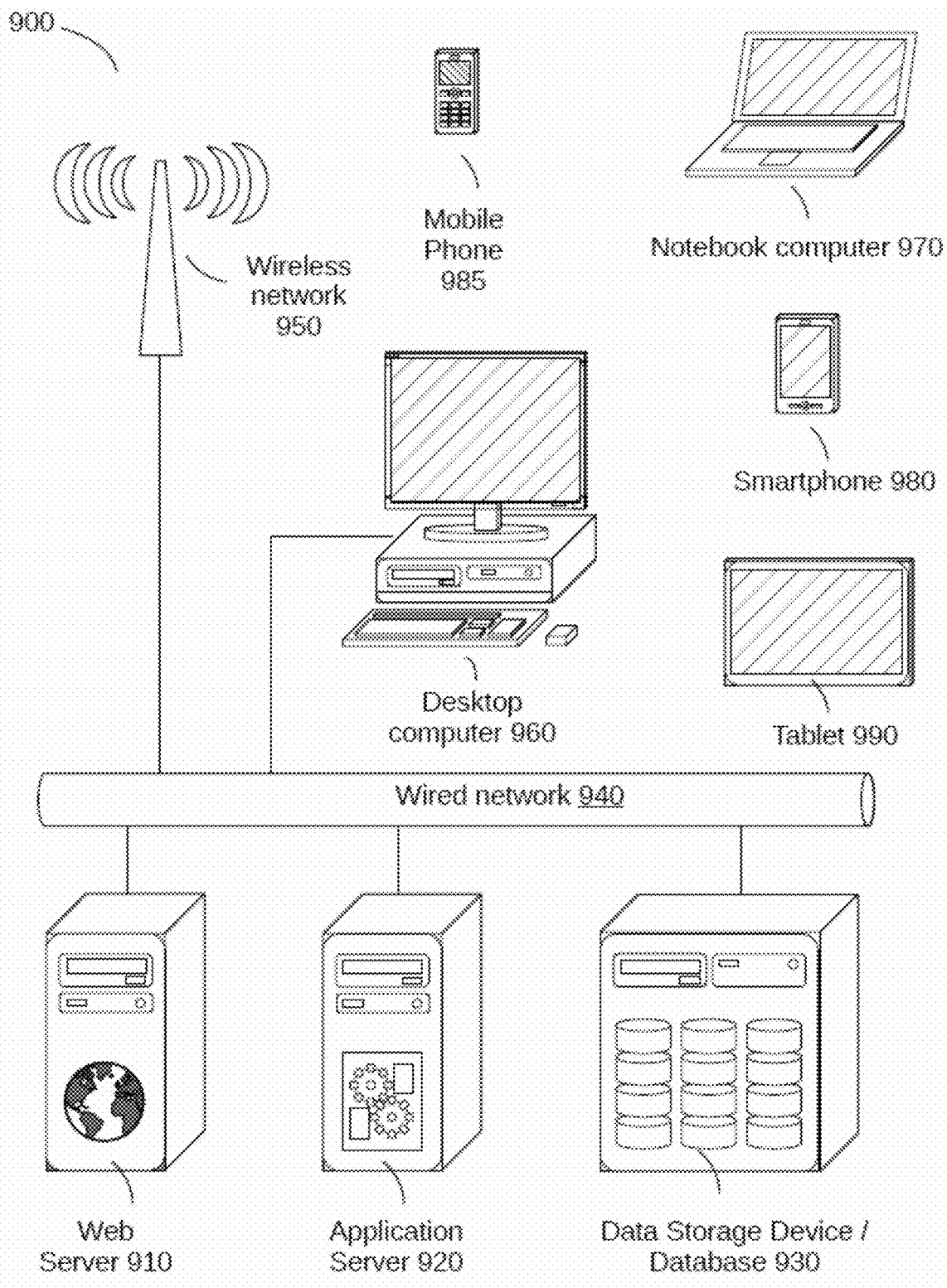
FIG. 8 is a general block diagram of a system and accompanying computing environment usable to implement the embodiments of FIGS. 1-7.

FIG. 8 is a general block diagram of a system 900 and accompanying computing environment usable to implement the embodiments of FIGS. 1-7. The example system 900 is capable of supporting or running various hardware and/or software modules and associated methods discussed with reference to FIGS. 1-1. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 5, the developer system(s) 12, 152 (also called client systems, as they may be used by persons other than a "developer") of FIGS. 1 and 4 may be implemented in whole or in part via one or more of the desktop computer 960, notebook computer 970, smartphone 980, mobile phone 985, tablet 990, of FIG. 8 and/or other computing devices.

In a particular example embodiment, the computing devices 960-990 run browsers, e.g., used to display the UI display screens for the client-side software 18 (e.g., browser) of FIG. 1 an UI display screens 162 for the server-side REST editor 38 of FIG. 4.

In a particular example embodiment, browsers of the client-side system(s) 12 of FIG. 1 connect to the Internet, represented by the wired network 940 and/or wireless network 950 as shown in FIG. 8, to thereby access one or more network-coupled servers, databases, and/or associated cloud-based functionality, e.g., as represented, in FIG. 1, by the server system 14 and accompanying developer software 34, REST API model abstraction 26 and enterprise applications 16 and databases 32.

Examples of process cloud functionality that may be accessed and used by the client-side system(s) 12 include process cloud services and accompanying process-based application development functionality 34, 36, 28 shown in FIG. 1.

Note that one or more of the web server 910, application server 920, and data storage device or database 930 shown in FIG. 8 may be used to host software corresponding to the modules 24-38, 14, 16 of FIG. 1, and modules 26, 38, 50, 154-160, 164 of FIG. 4, as detailed more fully below.

In the particular example embodiment, process cloud functionality 14, 16, 26, 34 of FIG. 1 runs in a cloud computing environment that includes a collection of plural web servers 910, application servers 920, and data storage devices 930 shown in FIG. 8.

For example, in a particular example embodiment, process-based application development functionality 34 (e.g., as may be implemented using a PCS composer) of FIG. 1 runs on a process cloud that communicates with a document cloud via an integration mechanism, e.g., middleware, APIs, web services, etc. The document cloud may maintain data that may otherwise be maintained in a process database (e.g., as may be represented by database 32 and accompanying database management system enterprise application 16 of FIG. 1).

Note that a runtime of the application development systems 34 of FIG. 1 and a runtime of the server system 14 of FIG. 1 may run on one or more application servers 920, as shown in FIG. 8. Furthermore, the enterprise applications 16 of FIG. 1 may run on the one or more application servers 920 of FIG. 8 and may have further access to enterprise the enterprise databases 32 of FIG. 1, which may be maintained via one or more of the data storage devices 930 of FIG. 8.

Note that in certain implementations, the webpage code 24 of FIG. 1 may run on a web server of the server system 14, which may be implemented via one or more of the web servers 910 of FIG. 8. The REST APIs 28 may also run on a web server, or alternatively, on an application server that hosts the enterprise applications 16, such as the application server 920 of FIG. 8. Furthermore, note that the connectors catalog 160 may also be hosted on one or more of the data storage devices 930 of FIG. 8.

In general, software developers and/or other users of the client-side system(s) 12, 152 of FIGS. 1 and 4, may subscribe to certain cloud services to facilitate development of and use of software applications and storage of associated files. A cloud service that is configured for software application or process flow development and/or implementation is called a PCS herein. A PCS may employ a networked database, e.g., the data storage device 930 of FIG. 8, to store files and other objects used by a given software program being developed.

In general, the example server-side development environments discussed herein may be accessible to developers via browsers. The development environments may be backed by the PCS, such that certain developed software application files are stored in a PCS database (e.g., one of the databases 32 of FIG. 1) corresponding to the one or more of the data storage devices 930 of FIG. 8.

In the particular example embodiment, the UI display screens 162 of FIG. 4 and associated wizard UI display screens generated by the REST editor UI rendering module 156 of the REST editor 38 include accompanying UI controls and associated options. Example options include options to browse, create, delete, define, upload, download, etc., specifications for process-based software applications, configuration files, connector specifications, and so on.

Note that in the particular example embodiment, browsers used by the client-side systems 12, 152 of FIGS. 1 and 4 interface with web servers 910 shown in FIG. 8 to access websites and accompanying webpage code, which is backed by applications used to implement the modules 24-38, 14, 16 of FIG. 1, and modules 26, 38, 50, 154-160, 164 of FIG. 4.

The webpage code of the web servers 910 of FIG. 8 may include or otherwise use or call web services, APIs, and/or other interfacing mechanisms to communicate with application software hosted on application servers 920 of FIG. 8 of the cloud, which includes a collection of web servers 910, application servers 920, and data storage devices 930 of FIG. 8.

Note that various embodiments discussed herein may provide substantial benefits in terms of providing efficiencies in systems and methods that achieve a new and useful end as it pertains to new software usability; particularly usability of development environments for process-based software applications that demand a simplified interface for constructing REST connectors for use in implementing steps of process-based software applications.

Figure 9:
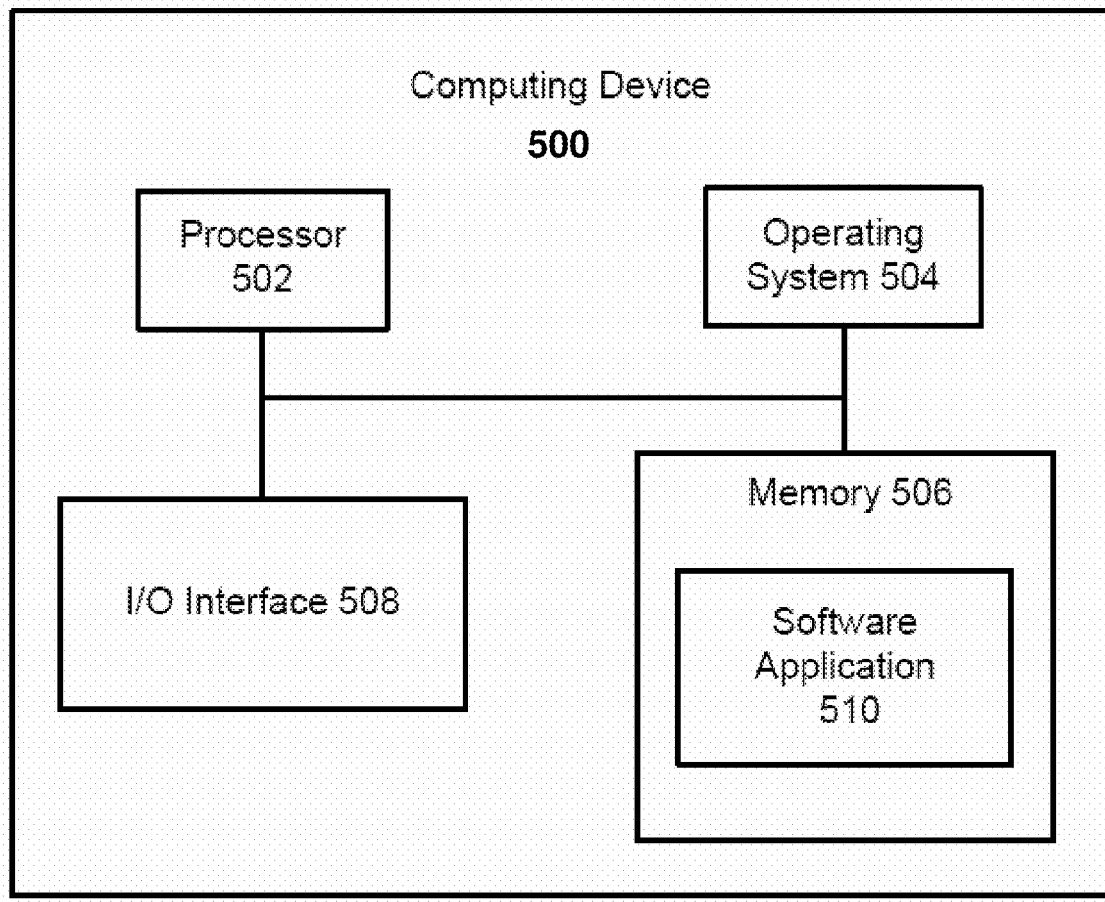
FIG. 9 is a general block diagram of a computing device usable to implement the embodiments of FIGS. 1-8.

FIG. 9 is a general block diagram of a computing device usable to implement the embodiments of FIGS. 1-3. While computing device 500 of FIG. 9 is described as facilitating performing the steps as described in certain implementations herein, any suitable component or combination of components of computing device 500 or any suitable processor or processors associated with computing device 500 (also called computing system herein) may be used for performing the steps described.

Hence, the example computing system 500 of FIG. 9 may be used for implementations described herein. For example, computing system 500 may be used to implement server devices 910, 920 of FIG. 8 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 9 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments discussed herein involve integrating or leveraging functionality of a process cloud to facilitate use of a simplified model for representing and streamlining developer interaction with REST APIs or services that are used with process-based software applications (e.g., by using REST connectors that have been developed using a flat REST editor structure), embodiments are not limited thereto. For example, other types of software; not just process-based software applications (e.g., that may be represented via BPMN models) may be more readily developed using embodiments discussed herein that simplify developer tasks required to implement REST service calls and/or other types of service calls.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of providing communication between a client system and a process-based software application, the method comprising:
   receiving, at a user interface, resource-to-operation pairs;
   storing the resource-to-operation pairs in a model abstraction as a flat structure;
   converting the resource-to-operation pairs in the flat structure into Representational State Transfer (REST) connectors, wherein the REST connectors are encoded in a conventional interface description language, wherein the resource-to-operation-pairs in the REST connectors are capable of being translated from the flat structure to a hierarchical structure in the conventional interface description language and, wherein the hierarchical structure is capable of being translated to the flat structure;
   storing the REST connectors in webpage code;
   receiving, at the webpage code, a request from the client system for a service of a process step of the process-based software application;
   translating, performed by a REST connector in the webpage code, the request to a message that conforms with the service;
   receiving, at the webpage code, a response from the service;
   processing, performed at the webpage code, the response from the service; and
   accessing, via a browser located at the client system, data retrieved by the processing of the response.

2. The method as recited by claim 1, wherein an operation associated with one of the resource-to-operation pairs is selected from a request and a response.

3. The method as recited by claim 2, wherein a resource associated with the one of the resource-to-operation pairs is a base path to the operation.

4. The method as recited by claim 2, wherein the operation is associated with an action type.

5. The method as recited by claim 1, wherein the conventional interface description language is selected from a group including Web Application Description Language (WADL), Yet Another Markup Language (YAML), and RESTful API Modelling Language (RAML).

6. The method as recited by claim 1, wherein a resource associated with the hierarchical structure is associated with a base path and a non-base path.

7. The method as recited by claim 1, wherein the converting further comprises:
   generating a hierarchical structure that includes the REST connectors encoded in the conventional interface description language.

8. The method as recited by claim 1, wherein the storing of the REST connectors in the webpage code further comprises:
   storing the hierarchical structure including the REST connectors in the webpage code.

9. A non-transitory computer readable medium including instructions executable by one or more processors for performing a of providing communication between a client system and a process-based software application, the method comprising:
   receiving, at a user interface, resource-to-operation pairs;
   storing the resource-to-operation pairs in a model abstraction as a flat structure;
   converting the resource-to-operation pairs in the flat structure into Representational State Transfer (REST) connectors, wherein the REST connectors are encoded in a conventional interface description language, wherein the resource-to-operation-pairs in the REST connectors are capable of being translated from the flat structure to a hierarchical structure in the conventional interface description language and, wherein the hierarchical structure is capable of being translated to the flat structure;
   storing the REST connectors in webpage code;

receiving, at the webpage code, a request from the client system for a service of a process step of the process-based software application;

translating, performed by a REST connector in the webpage code, the request to a message that conforms with the service;

receiving, at the webpage code, a response from the service;

processing, performed at the webpage code, the response from the service; and accessing, via a browser located at the client system, data retrieved by the processing of the response.

10. The non-transitory computer readable medium as recited by claim 9, wherein an operation associated with one of the resource-to-operation pairs is selected from a request and a response.

11. The non-transitory computer readable medium as recited by claim 10, wherein a resource associated with the one of the resource-to-operation pairs is a base path to the operation.

12. The non-transitory computer readable medium as recited by claim 10, wherein the operation is associated with an action type.

13. The non-transitory computer readable medium as recited by claim 9, wherein the conventional interface description language is selected from a group including Web Application Description Language (WADL), Yet Another Markup Language (YAML), and RESTful API Modelling Language (RAML).

14. The non-transitory computer readable medium as recited by claim 9, wherein a resource associated with the hierarchical structure is associated with a base path and a non-base path.

15. The non-transitory computer readable medium as recited by claim 9, wherein the converting further comprises:

generating a hierarchical structure that includes the REST connectors encoded in the conventional interface description language.

16. An apparatus for facilitating defining a REpresentational State Transfer (REST) interface in a computing environment, the apparatus comprising:

one or more processors;

a non-transitory processor-readable storage device including instructions for:

receiving, at a user interface, resource-to-operation pairs;

storing the resource-to-operation pairs in a model abstraction as a flat structure;

converting the resource-to-operation pairs in the flat structure into REST connectors, wherein the REST connectors are encoded in a conventional interface description language, wherein the resource-to-operation-pairs in the REST connectors are capable of being translated from the flat structure to a hierarchical structure in the conventional interface description language and, wherein the hierarchical structure is capable of being translated to the flat structure;

storing the REST connectors in webpage code;

receiving, at the webpage code, a request from the client system for a service of a process step of the process-based software application;

translating, performed by a REST connector in the webpage code, the request to a message that conforms with the service;

receiving, at the webpage code, a response from the service;

processing, performed at the webpage code, the response from the service; and accessing, via a browser located at the client system, data retrieved by the processing of the response.

* * * * *